United States Patent [19]
Zhu et al.

[11] Patent Number: 5,812,699
[45] Date of Patent: Sep. 22, 1998

[54] COUNTER-BASED CONTROLLER FOR VIDEO COMPRESSION

[75] Inventors: Chunrong Zhu, Portland; Kenneth L. Waters, Aloha, both of Oreg.

[73] Assignee: Intel Corporation, Santa Clara, Calif.

[21] Appl. No.: 568,747

[22] Filed: Dec. 7, 1995

[51] Int. Cl.$^6$ ................................ G06K 9/36; H04N 7/12
[52] U.S. Cl. ...................... 382/232; 382/236; 348/405; 348/419
[58] Field of Search ...................................... 348/419, 409, 348/420, 405, 400, 471; 370/468; 358/426; 382/236, 232; 395/511; 364/514 R

[56] References Cited

U.S. PATENT DOCUMENTS

| | | | |
|---|---|---|---|
| 4,893,123 | 1/1990 | Boisson | 348/419 |
| 4,933,761 | 6/1990 | Murakami et al. | 348/622 |
| 5,046,071 | 9/1991 | Tanoi | 348/399 |
| 5,097,330 | 3/1992 | Guichard et al. | 348/399 |
| 5,122,877 | 6/1992 | Keesman | 348/420 |
| 5,134,476 | 7/1992 | Aravind et al. | 348/415 |
| 5,150,209 | 9/1992 | Baker et al. | 348/407 |
| 5,317,397 | 5/1994 | Odaka et al. | 382/232 |
| 5,333,012 | 7/1994 | Singhal et al. | 348/405 |
| 5,351,085 | 9/1994 | Coelho et al. | 348/391 |
| 5,367,629 | 11/1994 | Chu et al. | 382/253 |
| 5,461,422 | 10/1995 | Hsieh | 348/405 |

OTHER PUBLICATIONS

Kronander, "Post—and Pre–Processing in Coding of Image Sequences Using Filters with Motion Compensated History" 1988 Int. Conf. Acoustics, Speech. Sig. Processing, vol. 2, Apr. 1988, pp. 1104–1107.

*Primary Examiner*—David K. Moore
*Assistant Examiner*—Wenpeng Chen
*Attorney, Agent, or Firm*—William H. Murray, Esq.; N. Stephan Kinsella, Esq.

[57] ABSTRACT

A current level of a virtual transmission buffer is maintained and used to select video frames for compression. The current level is compared to a threshold to determine whether to compress the current frame. The threshold is dynamically maintained between an upper "full" level and a lower "clear" level. If the current level exceeds the full level, the video compression processing is changed to a decline mode in which the threshold is gradually decremented towards the clear level. In addition, if the current level exceeds a "watch" level for too long, then the video compression processing is also switched to the decline mode. The present invention allows the virtual buffer to absorb variability in compressed frame size from frame to frame without resulting in undesired latency.

34 Claims, 13 Drawing Sheets

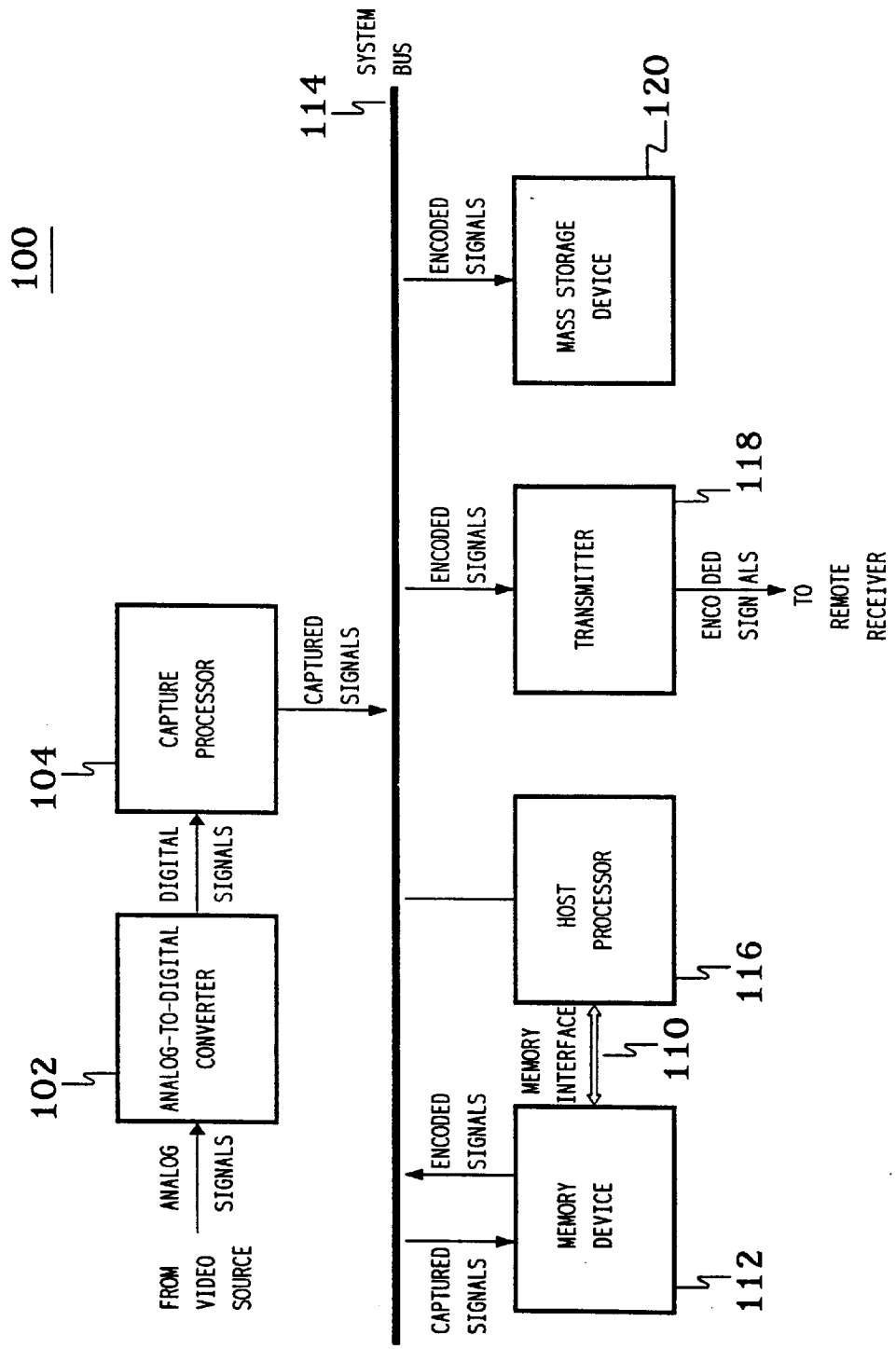
FIG. 1. ENCODING SYSTEM

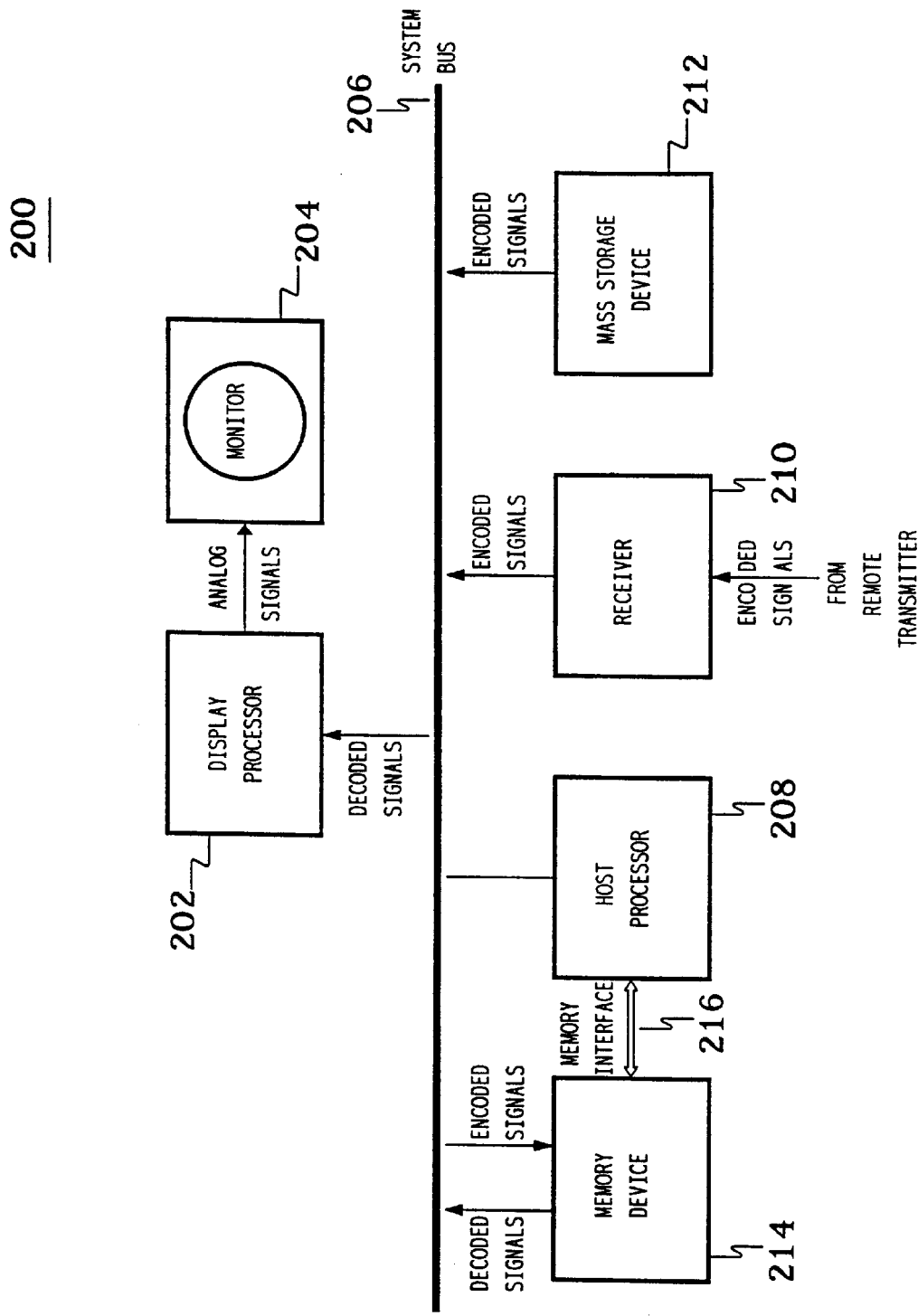

FIG. 3A

| (A) FRAMES | (B) TARGET | (C) BIT COUNTER (KBYTES) | (D) ACTUAL SELECTION | (E) BITS TO COMPRESS (KBYTES) |
|---|---|---|---|---|
| 1 | T1 | 0.0 | S1 | 1.2 |
| 2 |  | 0.8 |  |  |
| 3 |  | 0.4 |  |  |
| 4 | T2 | 0.0 | S2 | 1.2 |
| 5 |  | 0.8 |  |  |
| 6 |  | 0.4 |  |  |
| 7 | T3 | 0.0 | S3 | 1.6 |
| 8 |  | 1.2 |  |  |
| 9 |  | 0.8 |  |  |
| 10 | T4 | 0.4 |  |  |
| 11 |  | 0.0 | S4 | 1.2 |
| 12 |  | 0.8 |  |  |
| 13 | T5 | 0.4 |  |  |
| 14 |  | 0.0 | S5 | 0.8 |
| 15 |  | 0.4 |  |  |
| 16 | T6 | 0.0 | S6 | 1.2 |
| 17 |  | 0.8 |  |  |
| 18 |  | 0.4 |  |  |
| 19 | T7 | 0.0 | S7 | 1.2 |
| 20 |  | 0.8 |  |  |
| 21 |  | 0.4 |  |  |
| 22 | T8 | 0.0 | S8 | 1.2 |
| 23 |  | 0.8 |  |  |

FIG. 3B

| (A) FRAMES | (B) TARGET | (C) BIT COUNTER (KBYTES) | (D) ACTUAL SELECTION | (E) BITS TO COMPRESS (KBYTES) |
|---|---|---|---|---|
| 1 | T1 | 0.0 | S1 | 1.2 |
| 2 |  | 0.8 |  |  |
| 3 |  | 0.4 |  |  |
| 4 | T2 | 0.0 | S2 | 0.4 |
| 5 |  | 0.0 |  |  |
| 6 |  | −0.4 |  |  |
| 7 | T3 | −0.8 | S3 | 0.4 |
| 8 |  | −0.8 |  |  |
| 9 |  | −1.2 |  |  |
| 10 | T4 | −1.6 | S4 | 0.4 |
| 11 |  | −1.6 |  |  |
| 12 |  | −2.0 |  |  |
| 13 | T5 | −2.4 | S5 | 1.6 |
| 14 |  | −1.2 |  |  |
| 15 |  | −1.6 |  |  |
| 16 | T6 | −2.0 | S6 | 1.6 |
| 17 |  | −0.8 |  |  |
| 18 |  | −1.2 |  |  |
| 19 | T7 | −1.6 | S7 | 1.6 |
| 20 |  | −0.4 |  |  |
| 21 |  | −0.8 |  |  |
| 22 | T8 | −1.2 | S8 | 1.6 |
| 23 |  | 0.0 |  |  |
| 24 |  | −0.4 |  |  |
| 25 | T9 | −0.8 | S9 | 1.6 |
| 26 |  | 0.4 |  |  |
| 27 |  | 0.0 |  |  |
| 28 | T10 | −0.4 | S10 | 1.6 |
| 29 |  | 0.8 |  |  |
| 30 |  | 0.4 |  |  |
| 31 | T11 | 0.0 | S11 | 1.6 |
| 32 |  | 1.2 |  |  |
| 33 |  | 0.8 |  |  |
| 34 | T12 | 0.4 |  |  |
| 35 |  | 0.0 | S12 | 1.6 |
| 36 |  | 1.2 |  |  |

904, 1110

COUNTER-BASED CONTROLLER FOR VIDEO COMPRESSION

BACKGROUND OF THE INVENTION

1. Field of the Invention

The present invention relates to signal processing, and, in particular, to video compression and decompression using bitrate control.

2. Description of the Related Art

Conventional video cameras are designed to generate video signals for display on television screens. For example, NTSC cameras output 60 fields of analog video signals per second—30 even fields interleaved with 30 odd fields. PAL cameras generate 50 fields per second—25 even and 25 odd. Such video cameras may also be used to generate video signals for processing by a digital computer system for eventual display on a computer monitor. In that case, analog video signals from the camera are digitized and captured for further processing by the computer. The further processing may include compressing the digital video data for real-time transmission to a remote computer system for decompression and playback during a video conference. Alternatively or in addition, the compressed video data may be stored to memory (e.g., a hard drive) for future playback.

Conventional computer-based video compression systems process half of the fields of video signals generated by the video camera (e.g., the 30 odd fields per second of NTSC data) and ignore the other half (e.g., the 30 even fields per second). Every second, the computer system digitizes and captures 30 fields of video signals to generate 30 video frames.

In some video conferencing applications (e.g., those designed for ISDN connections), the transmission bandwidth for the compressed video data may be limited. As a result, not all of the video data generated by the video camera can be compressed and transmitted in real-time without overloading the system resources. In such applications, the computer system must decide which sets of video signals (i.e., which video frames) are to be selected for compression and transmission.

If every frame compressed to the same target size, then a uniform, constant frame rate could be achieved. For example, if the camera generates 30 video frames per second (fps), if the available transmission bandwidth is 12 KBytes per second, and if every frame compresses to exactly 1.2 KBytes, then a uniform frame rate of 10 fps can be achieved, with exactly every third frame being selected for compression. In reality, however, the size of compressed video frames varies from frame to frame. As a result, special processing is conventionally implemented to determine which frames to select for compression.

According to one such conventional scheme, the computer system determines which frames to select for compression based on a target frame rate, the transmission rate of the computer system, and the actual numbers of bits used to compress the previously selected frames. Every time a frame is selected for compression, the number of bits actually used to compress the selected frame is added to a bit counter. At the same time, bits are subtracted from the bit counter at a rate equivalent to the transmission rate of the computer system. When a frame is available for compression, if the bit counter is positive, then the frame is not allowed to be selected for compression. Only when the bit counter is zero or negative is the current frame eligible for selection.

In addition, under this conventional scheme, video processing is not permitted to get ahead of the target frame rate. This rule is typically imposed by the video compression protocol to which the computer system complies.

Referring now to FIG. 3A, there is shown a table that illustrates an example of the selection of video frames under conventional video compression processing. In the example of FIG. 3A, the computer system captures video signals from the video camera at a rate of 30 frames per second (fps), the target frame rate is 10 fps, and the transmission bandwidth allocated for compressed video data is 12 Kbytes per second. The target average compressed frame size is therefore 1.2 Kbytes.

Column (A) of FIG. 3A shows the input frames captured by the computer system from the video camera (numbered 1 to 23). Column (B) shows the target frames ($T_i$) that would be selected if the ideal target frame rate were achieved. Column (C) shows the value of the bit counter as each input frame is captured. Column (D) shows the actual frames ($S_i$) selected for compression. Column (E) shows the actual number of bits required to compress the selected frames. The values for the compressed frame sizes in Column (D) are idealized to illustrate the operations of conventional video processing and are not necessarily intended to represent realistic data.

If every frame compressed exactly to 1.2 Kbytes, then the target frame rate of 10 fps would be met by selecting every third frame (e.g., frames # 1, 4, 7, etc.) as shown in FIG. 3A as target frames $T_i$. In reality, however, the size of compressed video frames varies from frame to frame.

In the example of FIG. 3A, when frame #1 is captured, the bit counter is 0.0. Since this is not greater than 0, frame #1 is selected for compression. Frame #1 compresses to 1.2 KBytes, which is added to the bit counter. At the same time, 0.4 KBytes (the transmission rate per input frame) is subtracted from the bit counter to reflect the on-going transmission of compressed data. Thus, when frame #2 is captured, the bit counter is at 0.8 KBytes. Since this is greater than 0, frame #2 is not selected for compression. (Another reason for not selecting frame #2 for compression is that doing so would result in video compression processing getting ahead of the target frame rate, which is not allowed.)

Another 0.4 KBytes are subtracted from the bit counter to reflect the continued transmission of compressed data between frame #2 and frame #3. Thus, when frame #3 is captured, the bit counter is at 0.4 KBytes—still above zero. After subtracting another 0.4 KBytes from the bit counter, when frame #4 is captured, the bit counter is at 0.0 KBytes, implying that frame #4 can be selected for compression.

Similar processing continues until frame #7 is selected for compression. At this juncture, the actual frame rate has matched the target frame rate exactly. Frame #7 compresses to 1.6 KBytes. Adding this compressed frame size to the bit counter causes the selection of the next frame for compression to be delayed by an additional frame. As a result, frame #11 is selected for compression rather than target frame #10. The delay in selecting the next frame to compress was warranted by the additional number of bits required to be transmitted for frame #7.

Frame #11 compresses to 1.2 KBytes, causing frame #14 to be the next frame selected for compression. When frame #14 compresses to only 0.8 KBytes, the computer system is able to catch up to the target frame rate by selecting frame #16 as the next frame for compression. Since video compression processing was lagging the target frame rate, the time between compressed frames is allowed to be less than the target average of 3 frames. This allows the computer system to catch up, without violating the prohibition against getting ahead of the target frame rate. Since frame #16 and #19 both compress to the target compressed frame size of 1.2 KBytes, the target frame rate is once again maintained through frame #22.

The processing shown in FIG. 3A demonstrates how the conventional scheme of selection of frames for compression is able (1) to delay selection of the next frame to compress in order to accommodate larger-than-average compressed frames and (2) to catch up when processing lags the target frame rate. One problem with this conventional scheme, however, is that the durations between compressed frames from frame #4 to frame #19 were 3, 4, 3, 2, and 3 frames, sequentially. This short-term variation in the frame rate can be disturbing to the viewer of the decoded frames at the remote receiving node of the video conference.

Referring now to FIG. 3B, there is shown a table that illustrates another example of the selection of video frames under the same conventional scheme used in FIG. 3A. The target frame rate and the allocated transmission bandwidth for the example of FIG. 3B are the same as those for the example of FIG. 3A. FIG. 3B shows what can happen when a number of smaller-than-average frames are followed by a number of larger-than-average frames.

As shown in FIG. 3B, frame #1 is selected and compresses to 1.2 KBytes, resulting in frame #4 being selected as the next frame for compression. Frame #4 compresses to only 0.4 KBytes. Since the video compression processing is not allowed to get ahead of the target bit rate, however, the next frame selected for compression is frame #7. By the time frame #7 is captured, the bit counter has been decremented to −0.8 KBytes. Since this is not greater than 0, frame #7 is selected for compression.

Frame #7 also compresses to only 0.4 KBytes. Again the next allowable frame for compression is frame #10, by which time the bit counter has been decremented to −1.6 KBytes. Frame #10 also compresses to only 0.4 KBytes. Thus, when frame #13 is next selected for compression, the bit counter is at −2.4 KBytes.

Frame #13 compresses to 1.6 KBytes, which is larger than average. Under normal circumstances, this larger-than-average frame would result in a delay in the selection of the next frame to compress (as illustrated by the processing following frame #7 in FIG. 3A). However, since the bit counter was at −2.4 KBytes when frame #13 is selected for compression, the bit counter will only increase to −2.0 KBytes when the next frame (frame #16) becomes eligible for compression. Since the bit counter is not positive at that time, frame #16 is selected for compression. Thus, even though the computer system will have been able to transmit only 1.2 KBytes since frame #13 was selected for compression, nevertheless, frame #16 will be selected for compression.

In the example of FIG. 3B, frames #16, 19, 22, 25, and 28 are also selected for compression even though they all compress to 1.6 KBytes, just like frame #13. It is not until frame #31 that the bit counter will have recovered from the effects of smaller-than-average frames #4, 7, and 10. At that juncture, an appropriate delay will be applied to select frame #35 rather than target frame #34 for compression.

From frame #13 through frame #28, however, the actual bit rate will exceed the allocated transmission bandwidth by one-third. This can cause serious problems for the communication subsystem of the computer system, which may react by dropping one or more of the compressed frames to avoid having its buffer capacity overloaded with compressed data to transmit. The fact that all of the available bandwidth was not used for frames #4, 7, and 10 does not prevent this problem. In conventional communications subsystems, unused bandwidth cannot be saved for later use.

In the examples of FIGS. 3A–B, it is assumed that frame compression is completed before the next input frame is captured. In reality, frames may take much longer to compress. This can lead to pipelining problems. For example, if it takes over three frames worth of time to compress frame #7 of FIG. 3A, when the time comes to decide whether to encode frame #10, the controller will not know that frame #7 requires more than the average number of bits to encode. As such, frame #10 may be selected for compression even though the size of frame #7 warrants a delay. The next selected frame is placed in the pipeline for processing before it is known that the previous frame implies the need for a delay.

This pipelining problem is exacerbated by the fact that frames that take longer to compress are typically those that require more bits to compress. Thus, the very frames that warrant a delay (i.e., larger-than-average frames) are those for which the delay is more likely to be missed due to pipelining of the next eligible frame.

Another problem with convention video compression processing is the "freeze frame" effect that can occur following an unusually large compressed frame, such as a key frame (i.e., an intra encoded frame). If a compressed frame is much larger than the target frame size, then the delay following that frame can be proportionately large, resulting in a sudden halt in the updating of the video display. This too can be annoying to the viewer.

It is accordingly an object of this invention to overcome the disadvantages and drawbacks of the known art and to provide an improved scheme for selecting frames for video compression.

Further objects and advantages of this invention will become apparent from the detailed description of a preferred embodiment which follows.

SUMMARY OF THE INVENTION

The present invention comprises a computer-implemented process, an apparatus, and a storage medium encoded with machine-readable computer program code for video compression. According to a preferred embodiment, a stream of video frames is provided and a current level of a transmission backlog is maintained for compressed video data. The current level is compared to a threshold, which is dynamically adjusted during the video compression processing. A next video frame of the stream is selected to compress based on that comparison. The selected video frame is compressed and the compressed video frame is transmitted.

The present invention also comprises a video compression subsystem, comprising a video codec and a video codec driver, connected to the video codec. According to a preferred embodiment, the video codec driver receives a stream of video frames and maintains a current level of a transmission backlog for compressed video data. The video codec driver compares the current level to a threshold, which the video codec driver adjusts dynamically during the video compression processing. The video codec driver selects a next video frame of the stream to compress based on that comparison, and the video codec compresses the selected video frame for transmission.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 1 is a block diagram of a video system for encoding video signals in a PC environment, according to a preferred embodiment of the present invention;

FIG. 2 is a computer system for decoding the video signals encoded by the computer system of FIG. 1, according to a preferred embodiment of the present invention;

FIG. 3A is a table that illustrates an example of the selection of video frames under conventional video compression processing;

FIG. 3B is a table that illustrates another example of the selection of video frames under conventional video compression processing;

DESCRIPTION OF THE PREFERRED EMBODIMENT(S)

Figure 4:
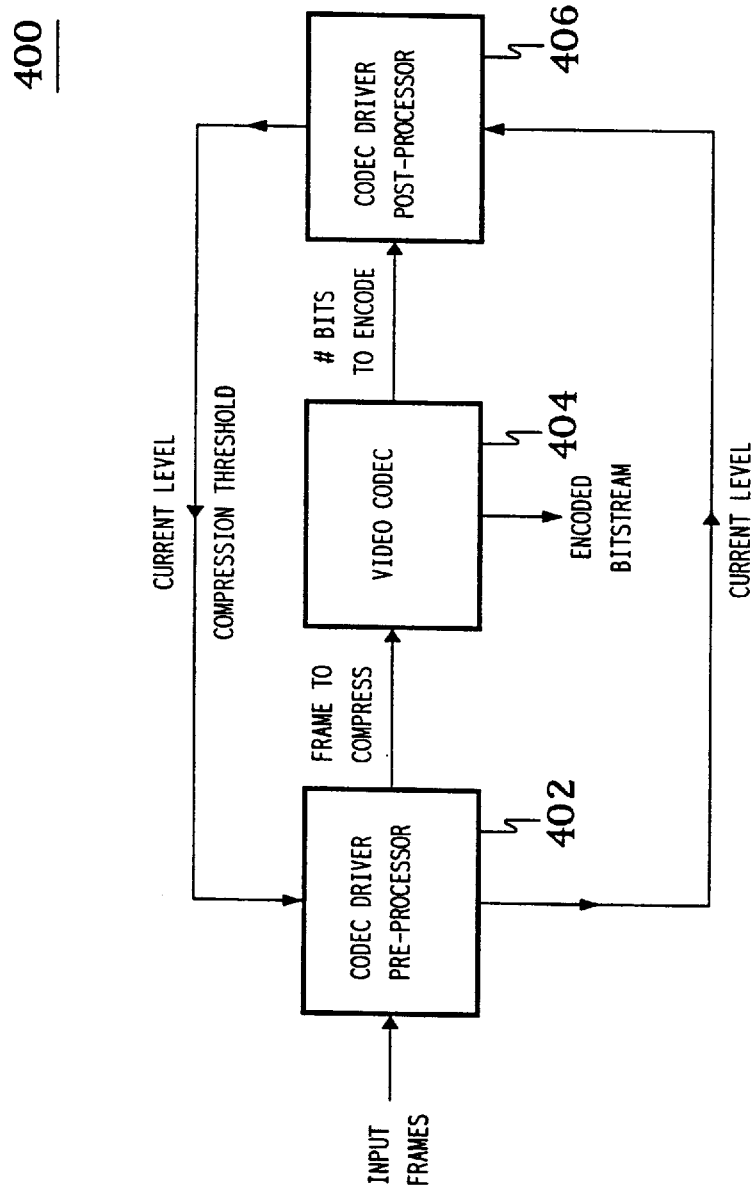
FIG. 4 is a block diagram of the video compression subsystem implemented on the host processor of the encoding system of FIG. 1, according to a preferred embodiment of the present invention.

The present invention provides an efficient algorithm for controlling bit rate during video conferencing over a network connection (e.g., ISDN line). The present invention is designed to respond to the variable frame sizes generated by conventional video encoders to achieve a more uniform frame rate without overflowing the communication buffers. The present invention also improves the utilization of allocated bandwidth by reducing the underflow of the communication buffers. As a result, there is less wasted bandwidth in the communication channel.

Conceptually, a codec driver selects video frames for compression by a video codec. The codec driver defines a virtual buffer of size B, which is bounded by any end-to-end delay and the sizes of any actual buffers in the communications layer. Compressed frames are "added" to the virtual buffer and data packets are "drained" out of the bottom of the virtual buffer to match the transmission of actual data packets over the network at a given constant transmission rate.

If the codec generates enough data such that the virtual buffer fills past a specified full level F, the duration between the next several frames selected for compression will be increased while the virtual buffer drains towards a specified clear level C. During this period, the codec drive operates in a "decline" mode. By allowing the virtual buffer to drain slowly, while still compressing frames in the decline mode, unwanted video freezes can be avoided.

To prevent video latency resulting from the virtual buffer level remaining near the full level F for too long, a watch level W is also defined. If the data in the virtual buffer remains above the watch level W but below the full level F for more than T consecutive frames, the codec driver will go into "decline"mode and force the virtual buffer to drain gradually to the clear level C.

The codec driver is preferably implemented in two parts. A first part is invoked every odd video field (e.g., 1/30th of a second for NTSC, 1/25th of second for PAL). This first part estimates the current buffer level and determines which frames from the incoming video stream are selected (i.e., scheduled) compression. The second part is invoked after the codec completes the compression of a selected video frame. This second part check for buffer fullness, watches for excessive latency, and initiates and terminates the decline mode using auxiliary functions described in further detail below.

The codec driver takes advantage of the presence of actual buffers in the communication layer and uses them to absorb short-term fluctuations of the compressed frame sizes. The allocated bandwidth is utilized more efficiently, while the encoder produces improved video quality for a given data rate.

The present invention provides advantages over conventional bitrate schemes. The codec driver of the present invention uses virtual buffering to absorb fluctuations in the compressed frame sizes without causing excessive latency. It achieves a higher frame rate and utilizes the bandwidth allocated for video more efficiently. Frames are compressed at a more uniform rate because premature delay scheduling is avoided. It handles key frames better by limiting visible video freeze effects that may otherwise follow larger-than-average frames, such as key frames.

System Hardware Architectures Referring now to FIG. 1, there is shown a computer system 100 for encoding video signals, according to a preferred embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 decodes (i.e., separates the signal into constituent components) and digitizes the analog video signals into digital video component signals (e.g., in one embodiment, 8-bit R, G, and B component signals).

Capture processor 104 captures the digitized component signals received from converter 102.

Capturing may include one or more of color conversion (e.g., RGB to YUV), scaling, and subsampling. Each captured video frame is represented by a set of three two-dimensional component planes, one for each component of the digitized video signals. In one embodiment, capture processor 104 captures video signals in a YUV9 (i.e., YUV 4:1:1) format, in which every (4×4) block of pixels in the Y-component plane corresponds to a single pixel in the U-component plane and a single pixel in the V-component plane. Capture processor 104 selectively stores the captured signals to memory device 112 and/or mass storage device 120 via system bus 114. Those skilled in the art will understand that, for real-time encoding, the captured signals are preferably stored to memory device 112, while for non-real-time encoding, the captured signals are preferably stored to mass storage device 120.

During real-time encoding, host processor 116 reads the captured bitmaps from memory device 112 via high-speed memory interface 110 and generates encoded video signals that represent the captured video signals. Depending upon the particular encoding scheme implemented, host processor 116 applies a sequence of compression steps to reduce the amount of data used to represent in the information in the video signals. The encoded video signals are then stored to memory device 112 via memory interface 112. and/or mass storage device 120 via system bus 114. Host processor 116 may copy the encoded video signals to mass storage device 120 and/or transmit the encoded video signals to transmitter 118 for real-time transmission to a remote receiver (not shown in FIG. 1).

Referring now the FIG. 2, there is shown a computer system 200 for decoding the video signals encoded by encoding system 100 of FIG. 1, according to a preferred embodiment of the present invention. Encoded video signals are either read from mass storage device 212 of decoding system 200 or received by receiver 210 from a remote transmitter, such as transmitter 118 of FIG. l. The encoded video signals are stored to memory device 214 via system bus 206.

Host processor 208 accesses the encoded signals stored in memory device 214 via high-speed memory interface 216 and decodes the encoded video signals for display. Decoding the encoded video signals involves undoing the compression processing implemented by encoding system 100 of FIG. 1.

Host processor 208 stores the decoded video signals to memory device 214 via memory interface 216 from where they are transmitted to display processor 202 via system bus 206. Alternatively, host processor 208 transmits the decoded video signals directly to display processor 202 via system bus 206. Display processor 202 processes the decoded video signals for display on monitor 204. The processing of display processor 202 includes digital-to-analog conversion of the decoded video signals. After being decoded by host processor 208 but before being D/A converted by display processor 202, the decoded video signals may be upsampled (e.g., from YUV9 to YUV24), scaled, and/or color converted (e.g., from YUV24 to RGB24 ). Depending upon the particular embodiment, each of these processing steps may be implemented by either host processor 208 or display processor 202.

Referring again to FIG. 1, encoding system 100 is preferably a microprocessor-based personal computer (PC) system with a special purpose video-processing plug-in board. In particular, A/D converter 102 may be any suitable means for decoding and digitizing analog video signals. Capture processor 104 may be any suitable processor for capturing digitized video component signals as subsampled frames. In a preferred embodiment, A/D converter 102 and capture processor 104 are contained in a single plug-in board capable of being added to a microprocessor-based PC system.

Host processor 116 may be any suitable means for controlling the operations of the special purpose video processing board and for performing video encoding. Host processor 116 is preferably an Intel® general-purpose microprocessor such as an Intel® i486™, Pentium™, or higher processor. System bus 114 may be any suitable digital signal transfer device and is preferably a Peripheral Component Interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital signals and is preferably a computer hard drive. Transmitter 118 may be any suitable means for transmitting digital signals to a remote receiver. Those skilled in the art will understand that the encoded video signals may be transmitted using any suitable means of transmission such as telephone line, RF antenna, local area network, or wide area network.

Referring again to FIG. 2, decoding system 200 is preferably a microprocessor-based PC system similar to the basic PC system of encoding system 100. In particular, host processor 208 may be any suitable means for decoding encoded video signals and is preferably an Intel®general purpose microprocessor such as an Intel®i486™, Pentium™, or higher processor. System bus 206 may be any suitable digital signal transfer device and is preferably a PCI bus. Mass storage device 212 may be any suitable means for storing digital signals and is preferably a CD-ROM device or a hard drive. Receiver 210 may be any suitable means for receiving the digital signals transmitted by transmitter 118 of encoding system 100. Display processor 202 and monitor 204 may be any suitable devices for processing and displaying video signals (including the conversion of digital video signals to analog video signals) and are preferably parts of a PC-based display system having a PCI graphics board and a 24-bit RGB monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video signals. Those skilled in the art will understand that such a combined system may be used to display decoded video signals in real-time to monitor the capture and encoding of video signals.

In alternative embodiments of present invention, the video encode processing of an encoding system and/or the video decode processing of a decoding system may be assisted by a pixel processor, such as an Intel®i750PE™ processor, or other suitable component(s) to off-load processing from the host processor by performing computationally intensive operations.

Codec Driver

Referring now to FIG. 4, there is shown a block diagram of video compression subsystem 400, according to a preferred embodiment of the present invention. Video compression subsystem 400 is preferably implemented in software on host processor 116 of encoding system 100 of FIG. 1, although it may also be implemented in software running on other processors or even in hardware.

Video compression subsystem 400 comprises a video codec 404, which performs the actual compression of video frames to generate the encoded bitstream for transmission and/or storage as shown in FIG. 1. In a preferred embodiment, codec 404 is unaware of time, in general, and is specifically unaware of the video stream generated by capture processor 104 of FIG. 1. A video codec driver, consisting of codec driver pre-processor 402 and codec driver post-processor 406, is responsible for selecting frames from the video stream for compression. Codec 404 is relatively passive—it compresses whatever frames are selected by the codec driver. In a preferred embodiment, however, codec 404 does perform its own bitrate control to adjust its compression processing. Those skilled in the art will understand that this may involve the selection of quantization levels to attempt to achieve a specified target compressed frame size. The bitrate control within codec 404 is preferably implemented in parallel with the bitrate control of the present invention.

Pre-processor 402 receives the input frames captured by capture processor 104 of FIG. 1 and, based on certain parameters generated by post-processor 406, selects a current frame for compression by codec 404. Post-processor 406 receives the number of bits actually used to compress the selected current frame and updates the parameters used by pre-processor 402 to select the next frame to compress.

Figure 5:
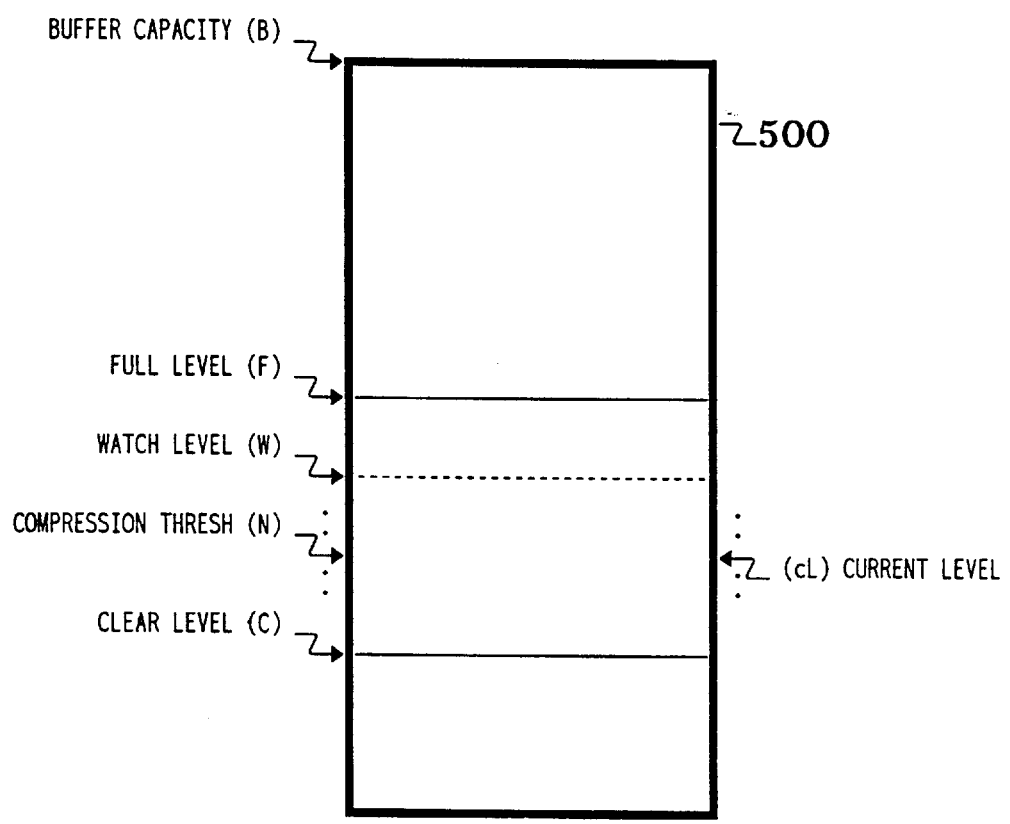
FIG. 5 shows a representation of the virtual buffer maintained by the codec driver of the video compression subsystem of FIG. 4.

Referring now to FIG. 5, there is shown a representation of the virtual buffer 500 maintained by the codec driver, according to a preferred embodiment of the present invention. The codec driver uses virtual buffer 500 to monitor the performance of video compression processing for use in selecting video frames to compress. Where transmitter 118 of encoding system 100 of FIG. I has an actual buffer that it uses to store data to be transmitted, virtual buffer 500 preferably has a capacity B equal to, but not greater than, the capacity of that actual transmission buffer. The other parameters shown in FIG. 5 (i.e., full level F, watch level W, clear level C, compression threshold N, and the current level cL) are used to control the processing of the codec driver and are preferably initialized as specified percentages of the buffer capacity B. As explained below, the compression threshold N and the current level cL are dynamic parameters that are changed by the codec driver during video compression processing.

The codec driver maintains a parameter indicating the current level cL of virtual buffer 500. As time passes, the current level cL is decremented by an amount equivalent to the transmission rate of transmitter 118. With every frame that is compressed, the current level cL is also incremented by the number of bits actually used to compress that frame. One goal of the codec driver of the present invention is to maintain the current level cL between the full level F and the clear level C. In order to avoid perpetual latency, another goal of the codec driver is to make sure that the current level cL does not stay above the watch level W for too long. Those skilled in the art will understand that the codec driver of the present invention implements a leaky bucket algorithm to monitor and control video compression processing to achieve these goals.

Codec Driver Pre-Processor

Figure 6:
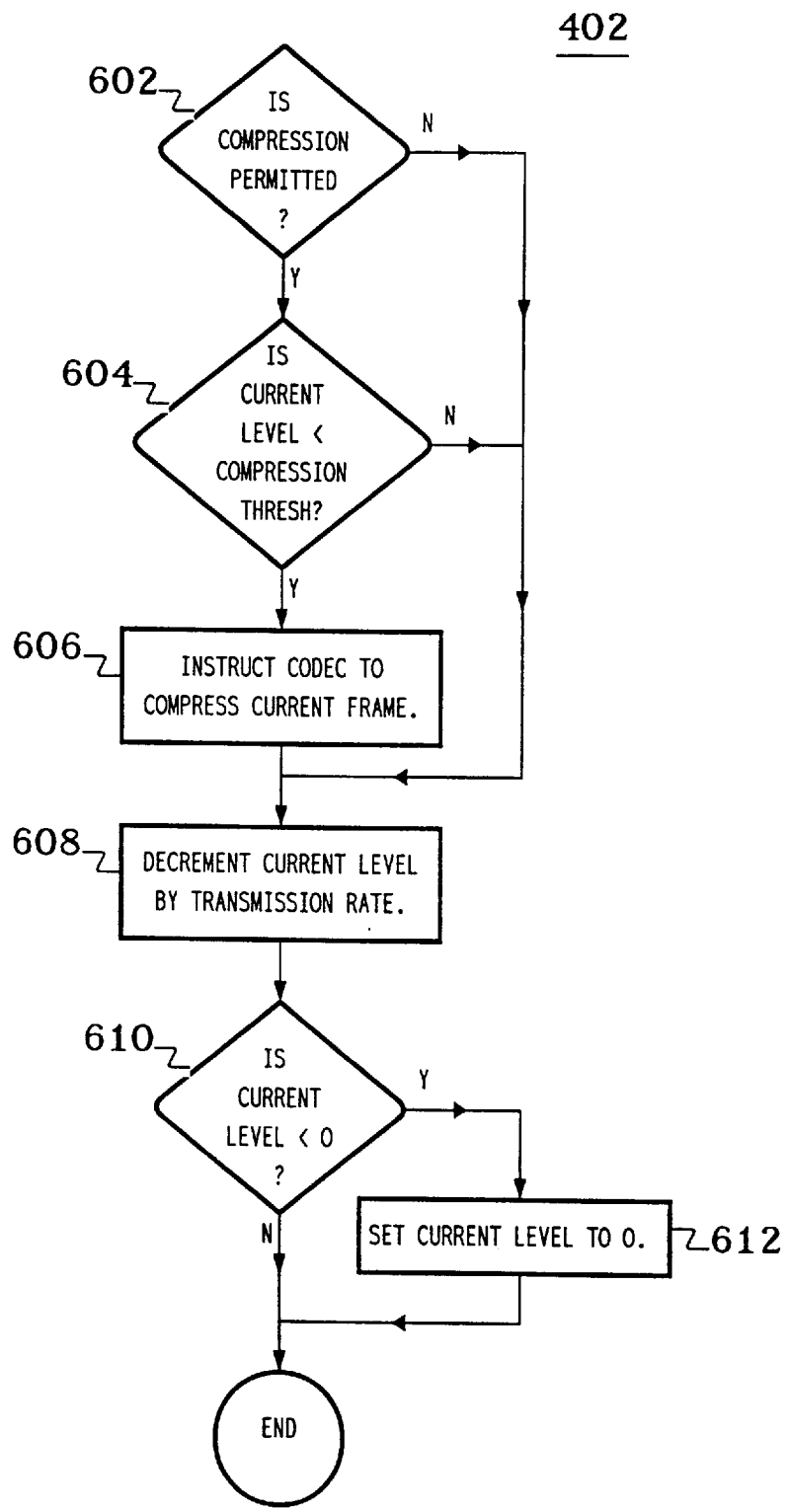
FIG. 6 is a flow diagram of the processing implemented by the codec driver pre-processor of the video compression subsystem of FIG. 4.

Referring now to FIG. 6, there is shown a flow diagram of the processing implemented by codec driver pre-processor 402 of video compression subsystem 400 of FIG. 4, according to a preferred embodiment of the present invention. Pre-processor 402 implements its processing for every frame generated by capture processor 104 of FIG. 1. It determines whether the current frame should be selected for compression by codec 404. It also updates the current level cL of virtual buffer 500.

In particular, pre-processor 402 determines whether compression is even permitted for the current frame (step 602 of FIG. 6). For example, if video compression processing is not allowed to get ahead of the target frame rate, then compression will not be permitted if compressing the current frame would have such a result. There may be other reasons, aside from bitrate control, for denying permission for compressing the current frame. These may be dictated by the video conferencing application program running on host processor 116. For example, the user may have selected a manual video pause option provided by the application program. In that case, video compression is preferably terminated until the user elects to "unpause" the video. If compression is not permitted, then processing continues to step 608. Otherwise, compression is permitted and processing continues to step 604.

At step 604, pre-processor 402 determines whether the current buffer level cL is less than the compression threshold N. The compression threshold N is a dynamic parameter that is preferably initialized to the full level F and updated by post-processor 406. If the current level cL is greater than or equal to the compression threshold N, then the current level cL is too high to allow another frame to be compressed at this time and processing continues to step 608. Otherwise, the current level cL is less than the compression threshold N and the current level cL is not too high to allow another frame to be compressed at this time. In that case, pre-processor 402 instructs codec 404 to compress the current frame (step 606).

Whether or not the current frame is selected for compression, the current level cL is decremented by the specified transmission rate 0 (step 608). The specified transmission rate 0 corresponds to the average transmission rate of transmitter 118 of FIG. 1. Transmission rate 0 corresponds to the leak in the leaky bucket. No matter what else happens during video compression processing, the bits in the virtual buffer 500 continue to drain just as transmitter 118 continues to transmit data from its actual buffer. Since transmitter 118 cannot transmit more bits than it has in its buffer, the current level cL is compared to zero (step 610) to make sure that it does not go negative (step 612).

Codec Driver Post-Processor

Figure 7:
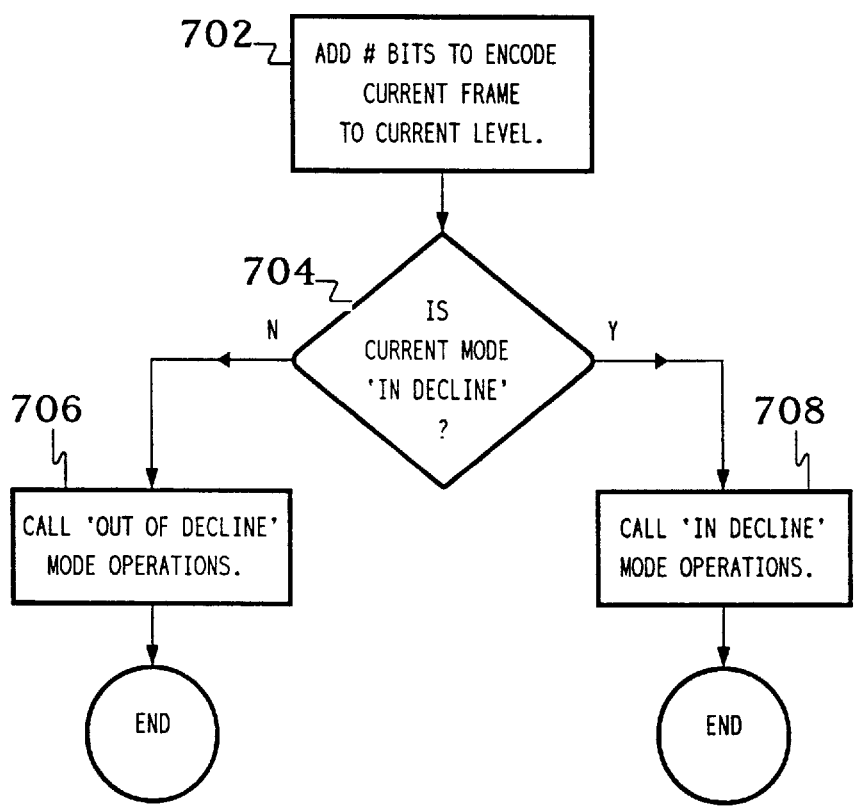
FIG. 7 is a flow diagram of the processing implemented by the codec driver post-processor of the video compression subsystem of FIG. 4.

Referring now to FIG. 7, there is shown a flow diagram of the processing implemented by codec driver post-processor 406 of video compression subsystem 400 of FIG. 4, according to a preferred embodiment of the present invention. Unlike pre-processor 402 which implements its processing for every frame generated by capture processor 104 of FIG. 1, post-processor 406 implements its processing only after a selected frame is compressed by codec 404. Post-processor 406 receives from codec 404 the number of bits actually used to encode the current frame and from pre-processor 402 the updated current level cL. Post-processor 406 uses those parameters to update the current level cL and the compression threshold N to be used by pre-processor 402 for the next frame.

In particular, post-processor 406 adds the number of bits (S) actually used by codec 404 to compress the current frame to the current level cL (step 702 of FIG. 7). This corresponds to the size of the compressed frame passed to the actual buffer of transmitter 118 for transmission to the remote receiver.

Post-processor 406 defines a current mode of video compression processing as being one of either "in decline" or "out of decline." Processing is in decline when the compression threshold N is being decreased with every compressed frame towards the clear level C. Decreasing the compression threshold N causes the pre-processor 402 to tend to increase the duration between frames selected for compression (see step 604 of FIG. 6). This allows the virtual buffer to drain while still allowing frames to be compressed. Processing is switched to the "out of decline" mode after the compression threshold N reaches the clear level C, at which time it is reset to the full level F.

If the current mode is "in decline" (step 704), then post-processor 406 implements "in decline"mode operations (step 708). Otherwise, the current mode is not "in decline" and post-processor 406 implements "out of decline" mode operations (step 706).

Figure 8:
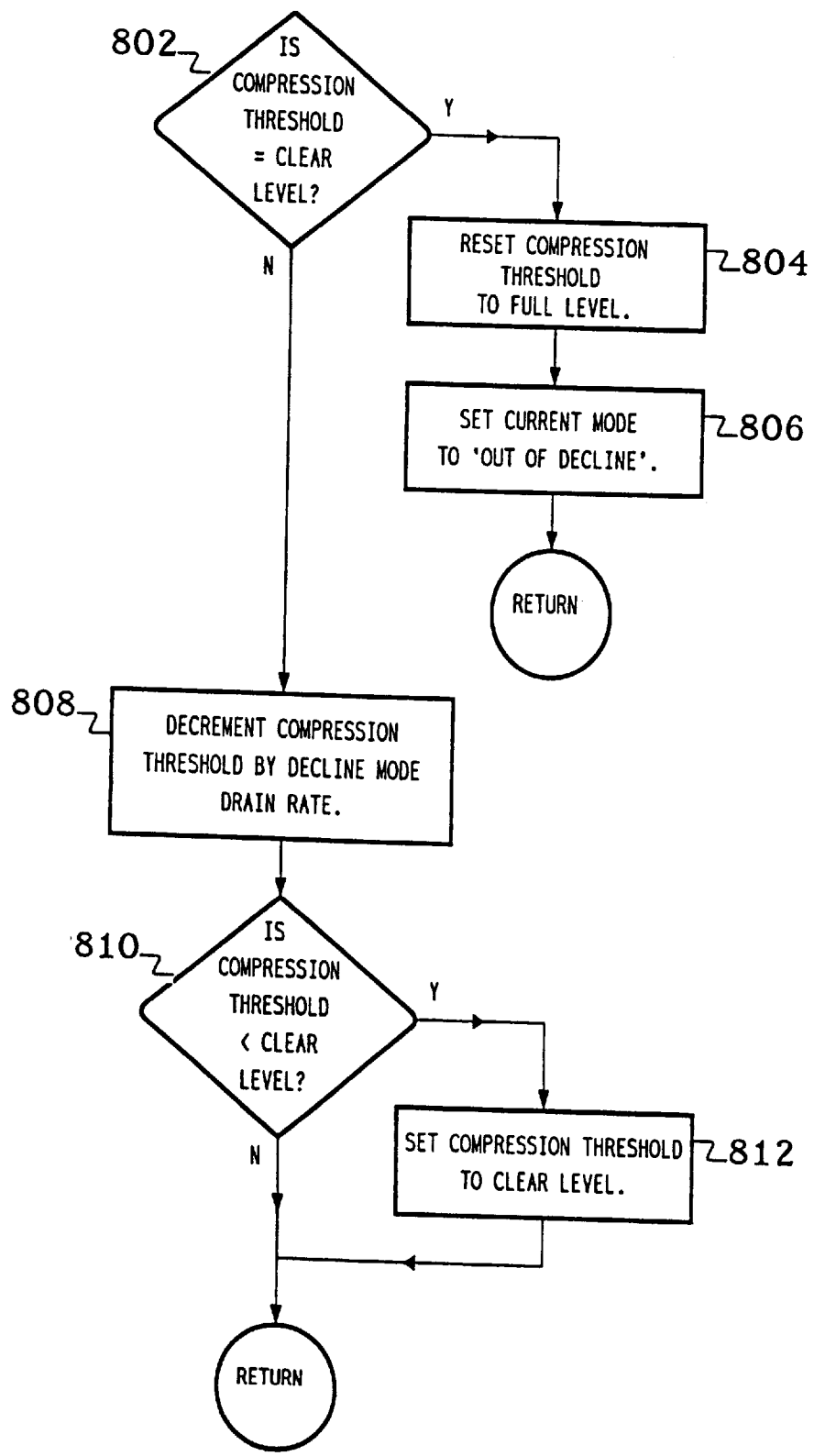
FIG. 8 is a flow diagram of the processing of the "in decline" mode operations of FIG. 7.

Referring now to FIG. 8, there is shown a flow diagram of the processing of the "in decline" mode operations of step 708 of FIG. 7. During "in decline" mode operations, the compression threshold N is decremented until it reaches the clear level C.

In particular, if the compression threshold N has reached the clear level C (step 802 of FIG. 8), then the "declining" of the compression threshold N is said to be complete. In that case, the compression threshold N is reset to the full level F (step 804) and the current mode is switched to "out of decline"(step 806).

On the other hand, if the compression threshold N has not reached the clear level C (step 802), then the "declining" of the compression threshold N is not complete. In that case, the compression threshold N is decremented by the specified decline mode drain rate D (step 808). The compression threshold N is preferably not allowed to go lower than the clear level C, so, if the compression threshold N is less than the clear level C (step 810), then the compression threshold N is set to the clear level C (step 812).

Figure 9:
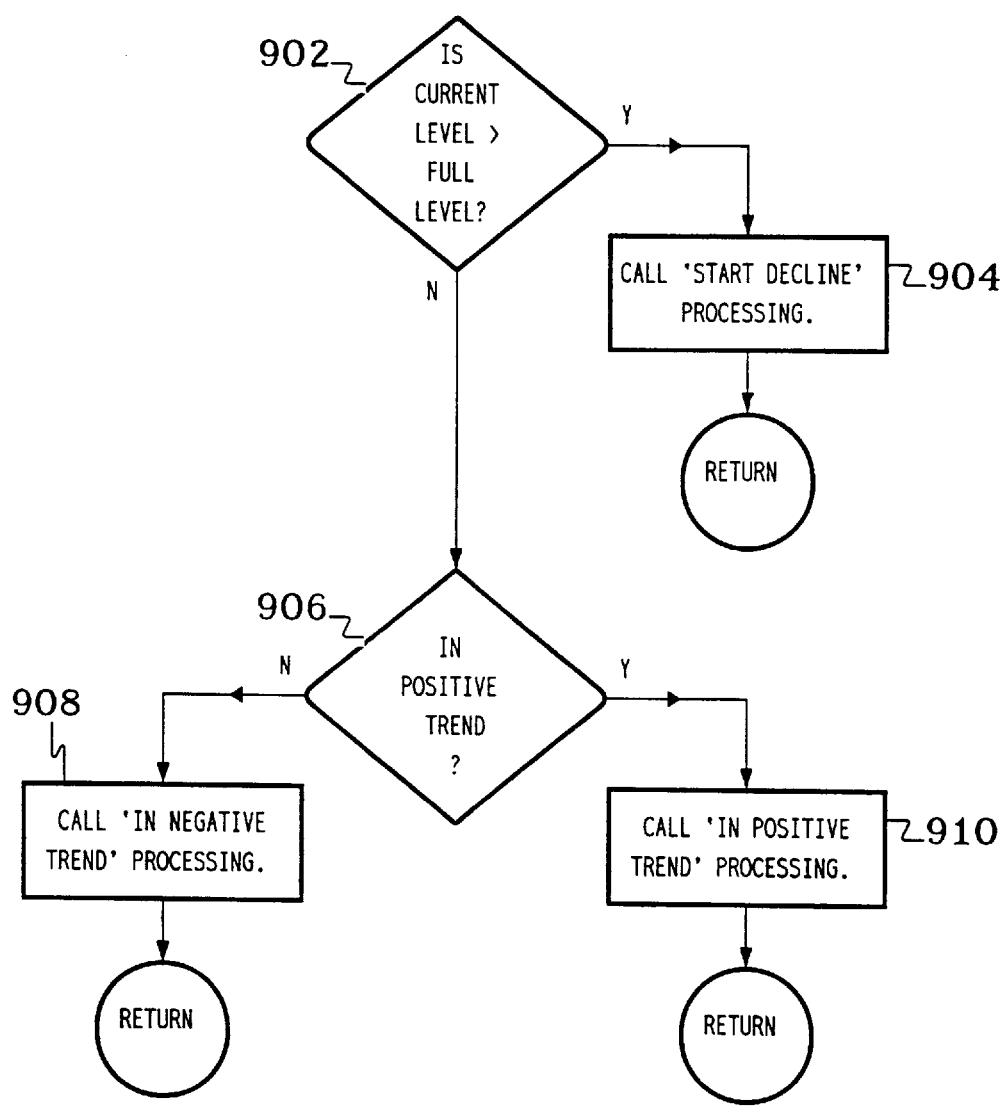
FIG. 9 is a flow diagram of the processing of the "out of decline" mode operations of FIG. 7.

Referring now to FIG. 9, there is shown a flow diagram of the processing of the "out of decline"mode operations of step 706 of FIG. 7. During "out of decline" mode operations, post-processor 406 compares the current level cL to the full level F and the watch level W to determine whether the current mode should be switched to the "in decline" mode.

In particular, if the current level cL is greater than the full level F (step 902 of FIG. 9), the current level is too high and the current mode should be switched to the "in decline" mode. In that case, the "start decline" processing is implemented (step 904).

If the current level cL is not greater than the full level F, then post-processor 406 determines whether video compression processing is currently in a positive trend or a negative trend (step 906). A positive trend means that the current level cL has been above the watch level for the previous one or more consecutive frames, while a negative trend means that the current level cL has been within the watch level for the previous one or more consecutive frames. If video compression processing is in a positive trend, then "in positive trend" processing is implemented (step 910). Otherwise, "in negative trend" processing is implemented (step 908).

Figure 10:
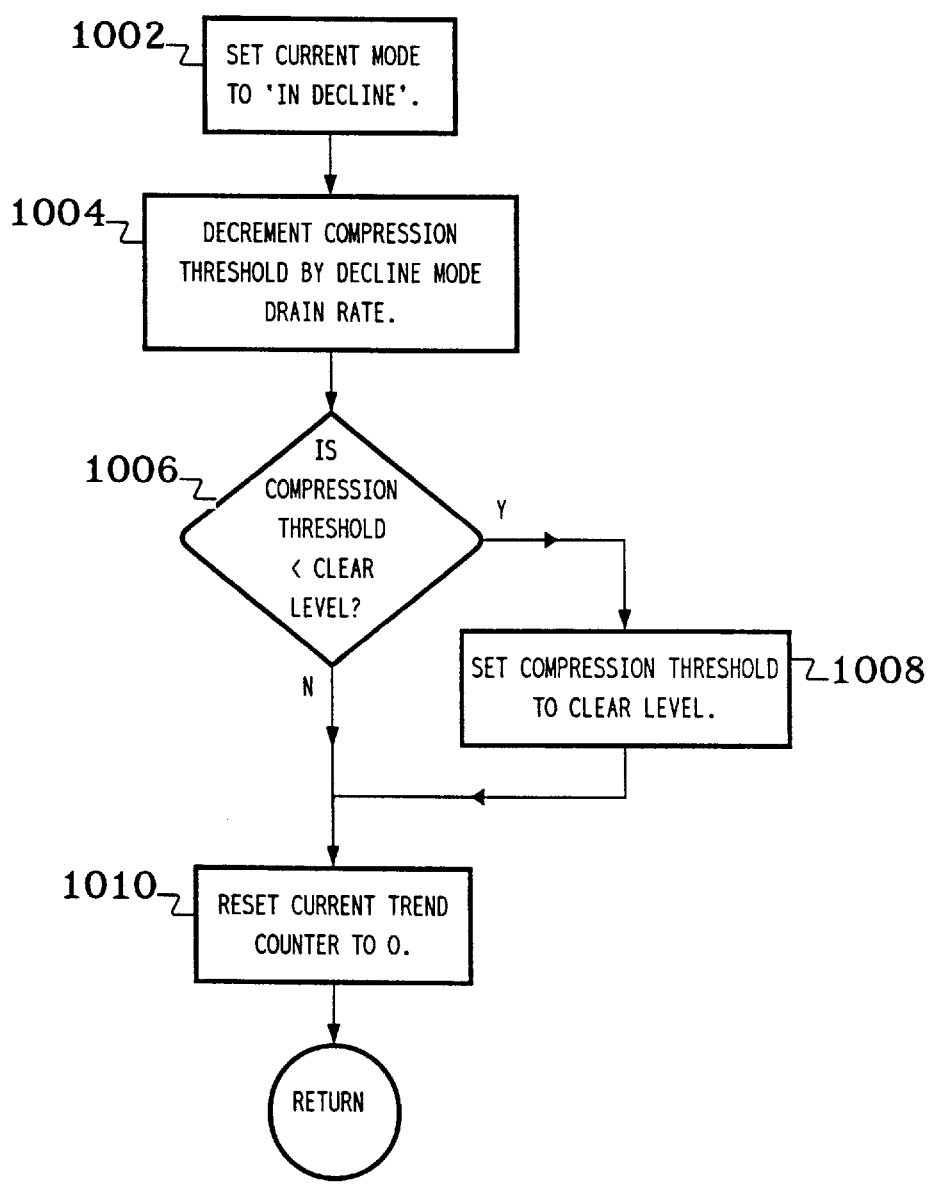
FIG. 10 is a flow diagram of the "start decline" processing of FIG. 9 and of FIG. 11.
Figure 11:
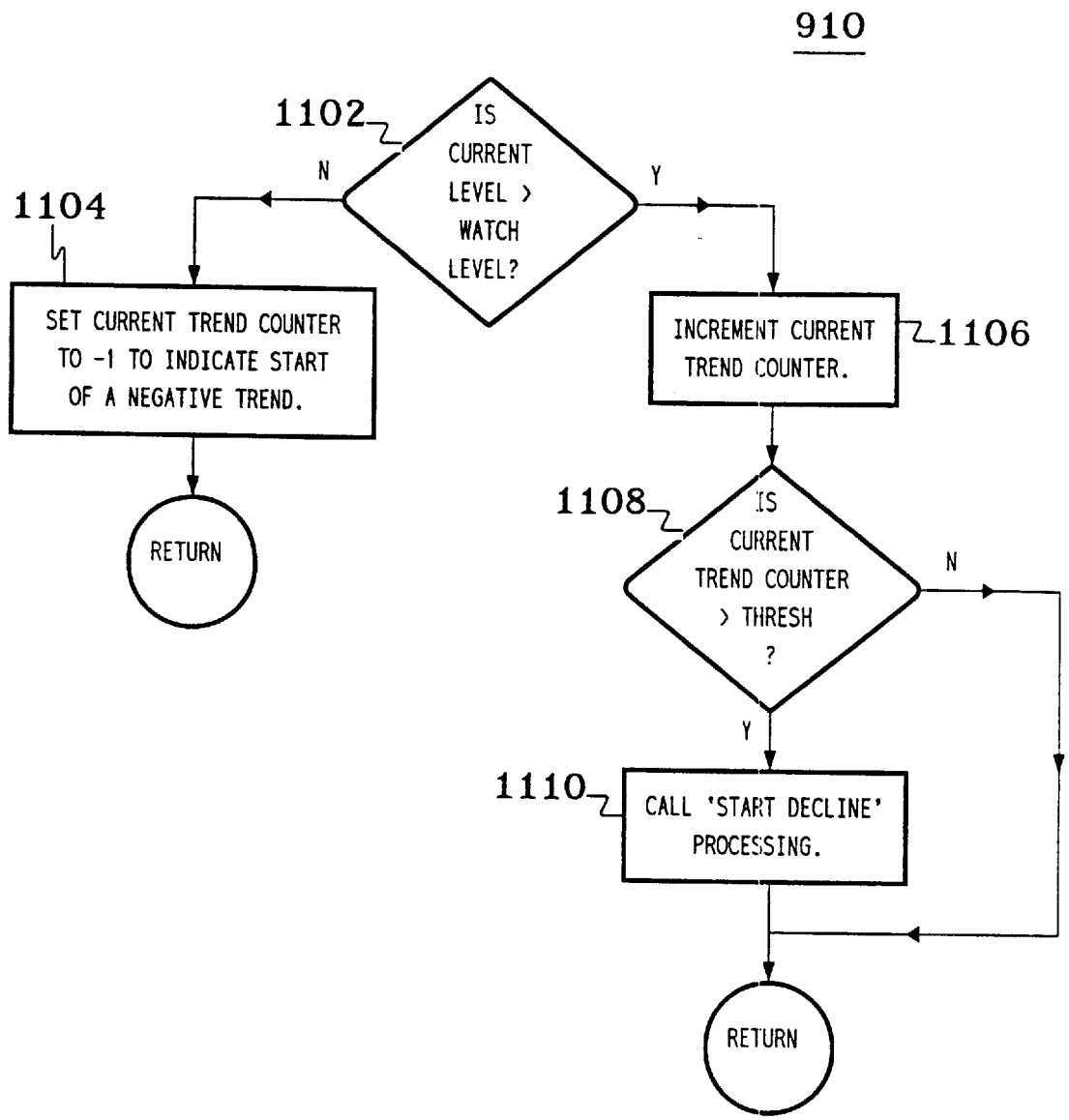
FIG. 11 is a flow diagram of the "in positive trend" processing of FIG. 9.

Referring now to FIG. 10, there is shown a flow diagram of the "start decline" processing of step 904 of FIG. 9 and step 1110 of FIG. 11. The "start decline" processing handles the transition from "out of decline" mode and into "in decline" mode.

In particular, the current mode is set to "in decline" (step 1002 of FIG. 10) and the compression threshold N is decremented by the specified decline mode drain rate D (step 1004). If the compression threshold N is less than the clear level C (step 1006), then the compression threshold N is set to the clear level C (step 1008). In either case, the current trend counter cT is set to zero (step 1010). The current trend counter counts how many times the current level cL is above the watch level W while video compression processing is in "out of decline" mode.

Referring now to FIG. 11, there is shown a flow diagram of the "in positive trend" processing of step 910 of FIG. 9. During a positive trend, post-processor 406 checks to see whether the current level cL is greater than the watch level W and, if so, for how long, to determine whether the current mode should be switched from the "out of decline" mode and into the "in decline" mode. This processing is designed to prevent undesired prolonged latency in the video compression processing.

In particular, if the current level cL is greater than the watch level W (step 1102), then the current trend counter cT is incremented (step 1106). If the current trend counter cT is greater than a specified threshold T (step 1108), then it is assumed that the current level cL has been above the watch level W for too long. In that case, the "start decline" processing of FIG. 10 is implemented (step 1110). If, however, the current level cL is not greater than the watch level W (step 1102), then the current trend counter cT is set to −1 to indicate that video compression processing is now in a negative trend (step 1104).

Figure 12:
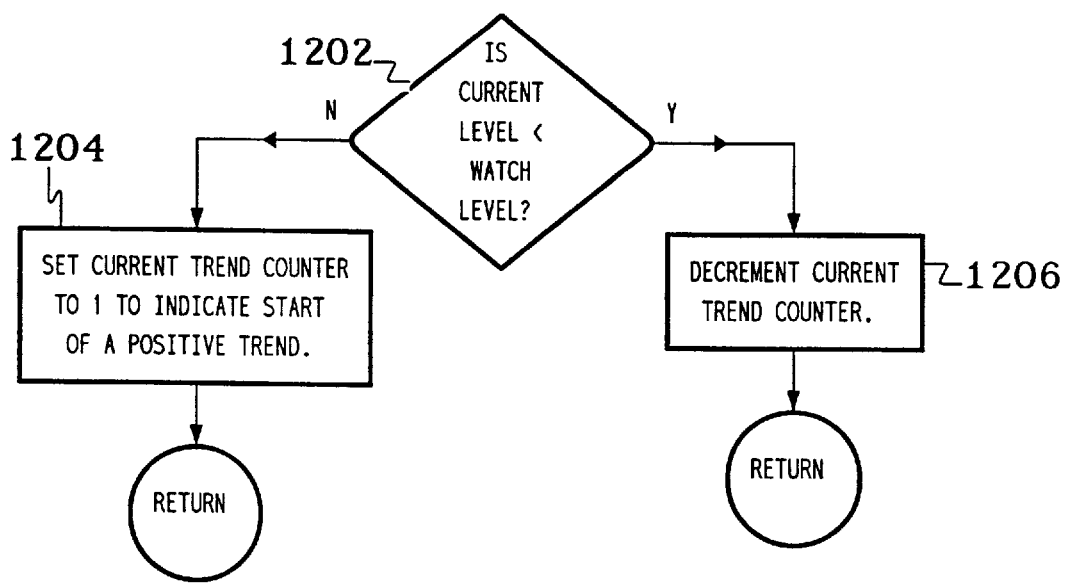
FIG. 12 is a flow diagram of the "in negative trend" processing of FIG. 9.

Referring now to FIG. 12, there is shown a flow diagram of the "in negative trend" processing of step 908 of FIG. 9. During a negative trend, post-processor 406 compares the current level cL to the watch level W to determine whether the current trend should be switched to a positive trend.

In particular, if the current level cL is less than the watch level W (step 1202), then the current negative trend should continue. In that case, the current trend counter cT is decremented (step 1206). The current trend counter cT is decremented for debugging purposes. In alternative embodiments, cT could be maintained at −1 or even 0 throughout the negative trend.

If, on the other hand, the current level cL is not less than the watch level W (step 1202), then the current trend should be switch to a positive trend. In that case, the current trend counter cT is sent to −1 to indicate the start of a positive trend for the video compression processing (step 1204).

Those skilled in the art will understand that, if appropriate values are selected for the various parameters, the present invention can be used to reduce the problem of frame-rate variability exhibited in the example of FIG. 3A. This is accomplished by absorbing short-term variations in compressed frame sizes into a virtual buffer. In addition, the present invention can be used to reduce the problem of transmission bandwidth overloading exhibited in the example of FIG. 3B by maintaining sensitivity to larger-than-average frames, even after compressing a number of smaller-than-average frames. This is accomplished by preventing the current virtual-buffer level from going negative.

Pseudo-code

The following is the pseudo-code for the processing of video driver pre-processor 402 and video driver post-processor 406 of FIG. 4.

```
// The following variables are defined as:
int B;      // size of the virtual buffer 500 of FIG. 7 in bytes
int F;      // the virtual buffer 'full' level
int W;      // the virtual buffer 'watch' level
int C;      // the virtual buffer 'clear' level
int N;      // the virtual buffer threshold to allow the next compression
```

```
int D;        // the amount of virtual buffer drain while in decline mode
int T;        // the 'trend' number, the number of consecutive frames above W to force decline
int S;        // the size of the current compressed frame
int O;        // the number of bytes drained from the virtual buffer each frame
int cL;       // the current virtual buffer level
int cT;       // the current trend
bool cD;      // flag to indicate whether processing is in decline mode
OddField() // called every frame; processing of FIG. 6
{
    // check if this frame can be compressed
    if(compression is permitted) and (cL < N)    // steps 602 and 604
        ScheduleCompression();                    // step 606
    // subtract one frame of data flow from the virtual buffer current level; keep it positive
    cL -=O;                                       // step 608
    if(cL < 0)cL = 0;                             // steps 610 and 612
}
ProcessCompressedFrame() // called after a frame is compressed; processing of FIG. 7
{
    // add compressed frame size to current virtual buffer level
    cL +=S;                                       // step 702
    // check if in or out of decline mode
    if cD                                         // step 704
        InDecline();                              // step 708
    else
        OutOfDecline();                           // step 706
}
InDecline()                                       // processing of FIG. 8
{
    // if processing has already declined to the 'clear' level; then end the decline, else continue declining
    if N == C                                     // step 802
        // the clear level has been reached, so end the decline
        {
        // set the compression level to the full level and reset the decline mode indicator
        N = F;                                    // step 804
        cD = FALSE;                               // step 806
        }
    else
        // continue declining, so subtract the number of decline bytes from the compression threshold
        // but don't let it go below the clear level
        {
        N -= D;                                   // step 808
        if (N < C) N = C;                         // step 810 and 812
        }
}
OutOfDecline()                                    // processing of FIG. 9
{
    // check if decline should start, either because the virtual buffer is above the full level
    // or the virtual buffer has been above the watch level for too long
    if(cL > F)                                    // step 902
        // the virtual buffer is full, so start the decline
        StartDecline();                           // step 904
    else
        // the virtual buffer isn't full, so check the trend to see if decline should start
        {
        if(cT>-1)                                 // step 906
            InPositiveTrend();                    // step 910
        else
            InNegativeTrend();                    // step 908
        }
}
StartDecline()                                    // processing of FIG. 10
{
    // set the indicator to show processing is in decline mode
    cD = TRUE;                                    // step 1002
    // decrease the compression threshold by the number of decline bytes,
    // but don't let it drop below the clear level
    N -= D;                                       // step 1004
    if(N < C) N = C;                              // steps 1006 and 1008
    // reset the trend counter to zero
    cT = 0;                                       // step 1010
}
InPositiveTrend()                                 // processing of FIG. 11
{
    // increase the positive trend if the virtual buffer is above the watch level or
    // start a negative trend if the virtual buffer is below the watch level
    if(cL > W)                                    // step 1102
    {
        // increase positive trend
        CT++;                                     // step 1106
```

```
        // if over the trend limit, then start the decline
        if(cT > T)                              // step 1108
            StartDecline();                     // step 1110
    }
    else
        {// start a negative trend
        cT = -1;}                               // step 1104
}
InNegativeTrend()                               // processing of FIG. 12
{
    // increase the negative trend if the virtual buffer is below the watch level or
    // start a positive trend if the virtual buffer is above the watch level
    if(cL < W)                                  //step 1202
        {// increase negative trend
        cT--;}                                  // step 1206
    else
        {// start a positive trend
        cT = 1;}                                // step 1208
}
```

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for video compression, comprising the steps of:
   (a) providing a stream of video frames;
   (b) maintaining a current level of a transmission backlog for compressed video data;
   (c) comparing the current level to a threshold, wherein:
      the threshold is dynamically adjusted during the video compression processing,
      the threshold is maintained between a full level and a clear level:
      and the threshold is gradually decremented when the video compression processing is in a decline mode;
   (d) selecting a next video frame to compress based on the comparison of step (c);
   (e) compressing the selected video frame; and
   (f) transmitting the compressed video frame.

2. The process of claim 1, wherein the transmission backlog is estimated as the current level of a virtual buffer.

3. The process of claim 1, wherein step (b) comprises the steps of:
   (1) incrementing the current level by a number of bits corresponding to each compressed video frame; and
   (2) decrementing the current level based on a transmission rate.

4. The process of claim 1, wherein the video compression processing is switched into the decline mode when the current level exceeds the full level.

5. The process of claim 1, wherein the video compression processing is switched out of the decline mode when the current level reaches the clear level.

6. The process of claim 5, wherein the threshold is set to the full level when the video compression processing is switched out of the decline mode.

7. The process of claim 1, wherein the video compression processing is switched into the decline mode when the current level exceeds a watch level for a specified number of compressed frames.

8. The process of claim 7, wherein:
   the transmission backlog is estimated as the current level of a virtual buffer;
   step (b) comprises the steps of:
      (1) incrementing the current level by a number of bits corresponding to each compressed video frame; and
      (2) decrementing the current level based on a transmission rate;
   the video compression processing is switched into the decline mode when the current level exceeds the full level;
   the video compression processing is switched out of the decline mode when the current level reaches the clear level; and
   the threshold is set to the full level when the video compression processing is switched out of the decline mode.

9. An apparatus for video compression, comprising:
   (a) means for providing a stream of video frames;
   (b) means for maintaining a current level of a transmission backlog for compressed video data;
   (c) means for comparing the current level to a threshold, wherein:
      the threshold is dynamically adjusted during the video compression processing,
      the threshold is maintained between a full level and a clear level,
      and the threshold is gradually decremented when the video compression processing is in a decline mode;

(d) means for selecting a next video frame to compress based on the comparison of means (c);

(e) means for compressing the selected video frame; and (f) means for transmitting the compressed video frame.

10. The apparatus of claim 9, wherein the transmission backlog is estimated as the current level of a virtual buffer.

11. The apparatus of claim 9, wherein means (b):

(1) increments the current level by a number of bits corresponding to each compressed video frame; and (2) decrements the current level based on a transmission rate.

12. The apparatus of claim 9, wherein the video compression processing is switched into the decline mode when the current level exceeds the full level.

13. The apparatus of claim 9, wherein the video compression processing is switched out of the decline mode when the current level reaches the clear level.

14. The apparatus of claim 13, wherein the threshold is set to the full level when the video compression processing is switched out of the decline mode.

15. The apparatus of claim 9, wherein the video compression processing is switched into the decline mode when the current level exceeds a watch level for a specified number of compressed frames.

16. The apparatus of claim 15, wherein:

the transmission backlog is estimated as the current level of a virtual buffer; means (b):

(1) increments the current level by a number of bits corresponding to each compressed video frame; and (2) decrements the current level based on a transmission rate;

the video compression processing is switched into the decline mode when the current level exceeds the full level;

the video compression processing is switched out of the decline mode when the current level reaches the clear level; and the threshold is set to the full level when the video compression processing is switched out of the decline mode.

17. A storage medium encoded with machine-readable computer program code for video compression, comprising:

(a) means for causing a computer to provide a stream of video frames;

(b) means for causing the computer to maintain a current level of a transmission backlog for compressed video data;

(c) means for causing the computer to compare the current level to a threshold, wherein the threshold is dynamically adjusted during the video compression processing;

(d) means for causing the computer to select a next video frame to compress based on the comparison of means (c);

(e) means for causing the computer to compress the selected video frame; and (f) means for causing the computer to transmit the compressed video frame.

18. The storage medium of claim 17, wherein the transmission backlog is estimated as the current level of a virtual buffer.

19. The storage medium of claim 17, wherein means (b) causes the computer to:

(1) increment the current level by a number of bits corresponding to each compressed video frame; and (2) decrement the current level based on a transmission rate.

20. The storage medium of claim 17, wherein the video compression processing is switched into the decline mode when the current level exceeds the full level.

21. The storage medium of claim 17, wherein the video compression processing is switched out of the decline mode when the current level reaches the clear level.

22. The storage medium of claim 21, wherein the threshold is set to the full level when the video compression processing is switched out of the decline mode.

23. The storage medium of claim 17, wherein the video compression processing is switched into the decline mode when the current level exceeds a watch level for a specified number of compressed frames.

24. The storage medium of claim 23, wherein:

the transmission backlog is estimated as the current level of a virtual buffer; means (b) causes the computer to:

(1) increment the current level by a number of bits corresponding to each compressed video frame; and (2) decrement the current level based on a transmission rate;

the video compression processing is switched into the decline mode when the current level exceeds the full level;

the video compression processing is switched out of the decline mode when the current level reaches the clear level; and the threshold is set to the full level when the video compression processing is switched out of the decline mode.

25. A video compression subsystem, comprising:

(a) a video codec; and (b) a video codec driver, connected to the video codec, wherein:

the video codec driver receives a stream of video frames;

the video codec driver maintains a current level of a transmission backlog for compressed video data;

the video codec driver compares the current level to a threshold;

the video codec driver dynamically adjusts the threshold during the video compression processing;

the video codec driver maintains the threshold between a full level and a clear level;

the threshold is gradually decremented when the video compression processing is in a decline mode;

the video codec driver selects a next video frame to compress based on the comparison of the current level to the threshold; and the video codec compresses the selected video frame for transmission.

26. The subsystem of claim 25, wherein the transmission backlog is estimated as the current level of a virtual buffer.

27. The subsystem of claim 25, wherein:

the video codec driver increments the current level by a number of bits corresponding to each compressed video frame; and the video codec driver decrements the current level based on a transmission rate.

28. The subsystem of claim 25, wherein the video compression processing is switched into the decline mode when the current level exceeds the full level.

29. The subsystem of claim 25, wherein the video compression processing is switched out of the decline mode when the current level reaches the clear level.

30. The subsystem of claim 29, wherein the threshold is set to the full level when the video compression processing is switched out of the decline mode.

31. The subsystem of claim 25, wherein the video compression processing is switched into the decline mode when the current level exceeds a watch level for a specified number of compressed frames.

32. The subsystem of claim 31, wherein:

the transmission backlog is estimated as the current level of a virtual buffer; the video codec driver:
(1) increments the current level by a number of bits corresponding to each compressed video frame; and
(2) decrements the current level based on a transmission rate;

the video compression processing is switched into the decline mode when the current level exceeds the full level;

the video compression processing is switched out of the decline mode when the current level reaches the clear level; and the threshold is set to the full level when the video compression processing is switched out of the decline mode.

33. A computer-implemented process for video compression, comprising the steps of:

(a) providing a stream of video frames;

(b) maintaining a current level cL of a transmission backlog for compressed video data;

(c) comparing cL to a compression threshold N to determine whether cL<N;

(d) compressing a next video frame, transmitting said compressed video frame, and updating cL in accordance with said compression and with said transmission, only if cL<N, wherein said next video frame is not compressed or transmitted if cL $\geq$ N; and (e) if cL$\geq$N, then entering a decline mode until N reaches a clear level, gradually decrementing N when the video compression processing is in the decline mode, and setting N to a full level and switching the video compression processing out of the decline mode when N reaches the clear level.

34. An apparatus for video compression, comprising:

(a) means for providing a stream of video frames;

(b) means for maintaining a current level cL of a transmission backlog for compressed video data;

(c) means for comparing cL to a compression threshold N to determine whether cL<N;

(d) means for compressing a next video frame, for transmitting said compressed video frame, and for updating cL in accordance with said compression and with said transmission, only if cL<N, wherein said next video frame is not compressed or transmitted if cL$\geq$N; and (e) means for entering a decline mode until N reaches a clear level, for gradually decrementing N when the video compression processing is in the decline mode, and for setting N to a full level and for switching the video compression processing out of the decline mode when N reaches the clear level, if cL$\geq$N.

* * * * *